United States Patent [19]

Yasuda et al.

[11] Patent Number: 4,794,942
[45] Date of Patent: Jan. 3, 1989

[54] AIR BREATHER PLUG ASSEMBLY FOR USE IN POWER TRANSMISSION UNIT

[75] Inventors: Mitsuyoshi Yasuda; Junichi Matsuura; Kazuhito Ikemoto; Nobuaki Katayama, all of Toyota, Japan

[73] Assignee: Toyota Jidosha Kabushiki Kaisha, Toyota, Japan

[21] Appl. No.: 77,218

[22] Filed: Jul. 24, 1987

[30] Foreign Application Priority Data

Jul. 25, 1986 [JP] Japan .................. 61-114861[U]

[51] Int. Cl.$^4$ .............................................. F16K 24/04
[52] U.S. Cl. ................................... 137/197; 137/587; 137/845; 222/209
[58] Field of Search .................... 137/197, 587, 845; 220/209

[56] References Cited

U.S. PATENT DOCUMENTS

| | | | |
|---|---|---|---|
| 2,269,679 | 1/1942 | Millenaar | 137/587 X |
| 2,823,694 | 2/1958 | Champion | 137/197 |
| 2,880,744 | 4/1959 | Daley | 137/197 |
| 3,406,862 | 10/1968 | Donaldson | 220/209 |
| 3,983,891 | 10/1976 | Shoemaker | 137/587 X |

Primary Examiner—Robert G. Nilson
Attorney, Agent, or Firm—Oblon, Fisher, Spivak, McClelland & Maier

[57] ABSTRACT

An air breather plug assembly adapted for use in a transmission or trans-axle casing includes a cylindrical plug body detachably threaded into an upper portion of the casing and having an inner end portion which extends into an interior of the casing in a predetermined length, a cup-shaped baffle-plate fixedly coupled within the inner end portion of the plug body and being formed with a slot for permitting the flow of air passing therethrough, a cup-shaped seal member of elastic material fixedly coupled within an outer end portion of the plug body and spaced from the baffle-plate in a predetermined distance, the seal member being formed with a slit to be opened by an internal pressure applied thereto from the interior of the casing through the baffle-plate, and a cap fixedly coupled over the outer end portion of the plug body in such a manner as to allow the air flowing from the interior of the plug body to the exterior through the slit of the seal member.

4 Claims, 2 Drawing Sheets

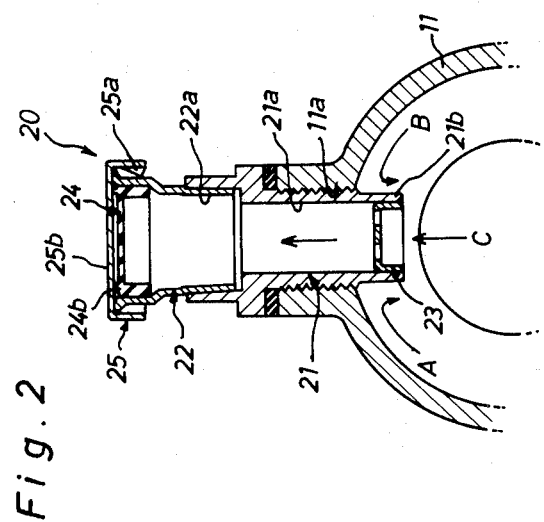
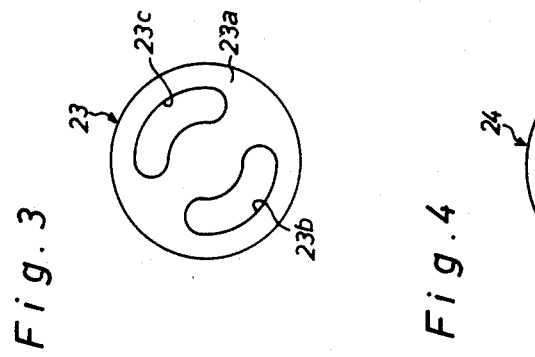
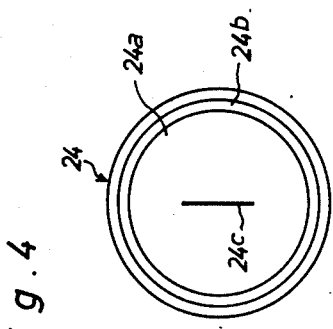

AIR BREATHER PLUG ASSEMBLY FOR USE IN POWER TRANSMISSION UNIT

BACKGROUND OF THE INVENTION

1. Field of the Invention

The present invention relates to a power transmission unit for automotive vehicles, and more particularly to an air breather plug assembly adapted for use in a casing of the power transmission unit.

2. Discussion of the Background

In general, such an air breather plug assembly as described above is mounted on the upper portion of a transmission or trans-axle casing to allow the flow of air out from the interior of the casing to the exterior and to prevent leakage of the lubricating oil out from the casing. As disclosed in Japanese Utility Model Early Publication No. 57-158519, the transmission or trans-axle casing has been provided therein with an annular isolated space for preventing the lubricating oil from being directly splashed on the inner end of the plug assembly. In recent years, however, the transmission or trans-axle casing is formed to contain a change-speed gearing driven by a high performance engine and a power transfer mechanism for four-wheel drive and is filled with a large amount of lubricating oil for sufficient lubrication of the change-speed gearing and the power transfer mechanism. For this reason, an increase of lubricating oil picked up by rotation of the change-speed gearing and rise of the oil temperature will cause leakage of the lubricating oil out from the casing.

SUMMARY OF THE INVENTION

It is, therefore, a primary object of the present invention to provide an improved air breather plug assembly which is detachably mounted on the transmission or trans-axle casing to prevent leakage of the lubricating oil out from the casing even when splashed with the lubricating oil.

A secondary object of the present invention is to provide an improved air breather plug assembly which may be adapted as an oil filler cap for the transmission or trans-axle casing.

According to the present invention, the objects are attained by providing an air breather plug assembly which comprises a cylindrical plug body detachably threaded into an upper portion of a transmission or trans-axle casing and having an inner end portion which extends into an interior of the casing by a predetermined length, a cup-shaped baffle-plate fixedly coupled within the inner end portion of the plug body, the baffle-plate being formed with a slot for permitting the flow of air passing therethrough, a cup-shaped seal member of elastic material fixedly coupled within an outer end portion of the plug body and spaced from the baffle-plate by a predetermined distance, the seal member being formed with a slit to be opened by an internal pressure applied thereto from the interior of the casing through the baffle-plate, and a cap fixedly coupled over the outer end portion of the plug body in such a manner as to allow the air flowing from the interior of the plug body to the exterior through the slit of the seal member.

BRIEF DESCRIPTION OF THE DRAWINGS

Additional objects, features and advantages of the present invention will be readily appreciated from the following detailed description of a preferred embodiment thereof when considered with reference to the accompanying drawings, in which:

FIG. 2 is an enlarged sectional view taken along the plane of line II—II in FIG. 1;

FIG. 3 is an enlarged plan view of a cup-shaped baffle-plate in the plug assembly; and FIG. 4 is an enlarged plan view of a cup-shaped seal member in the plug assembly.

DESCRIPTION OF THE PREFERRED EMBODIMENT

Figure 1:
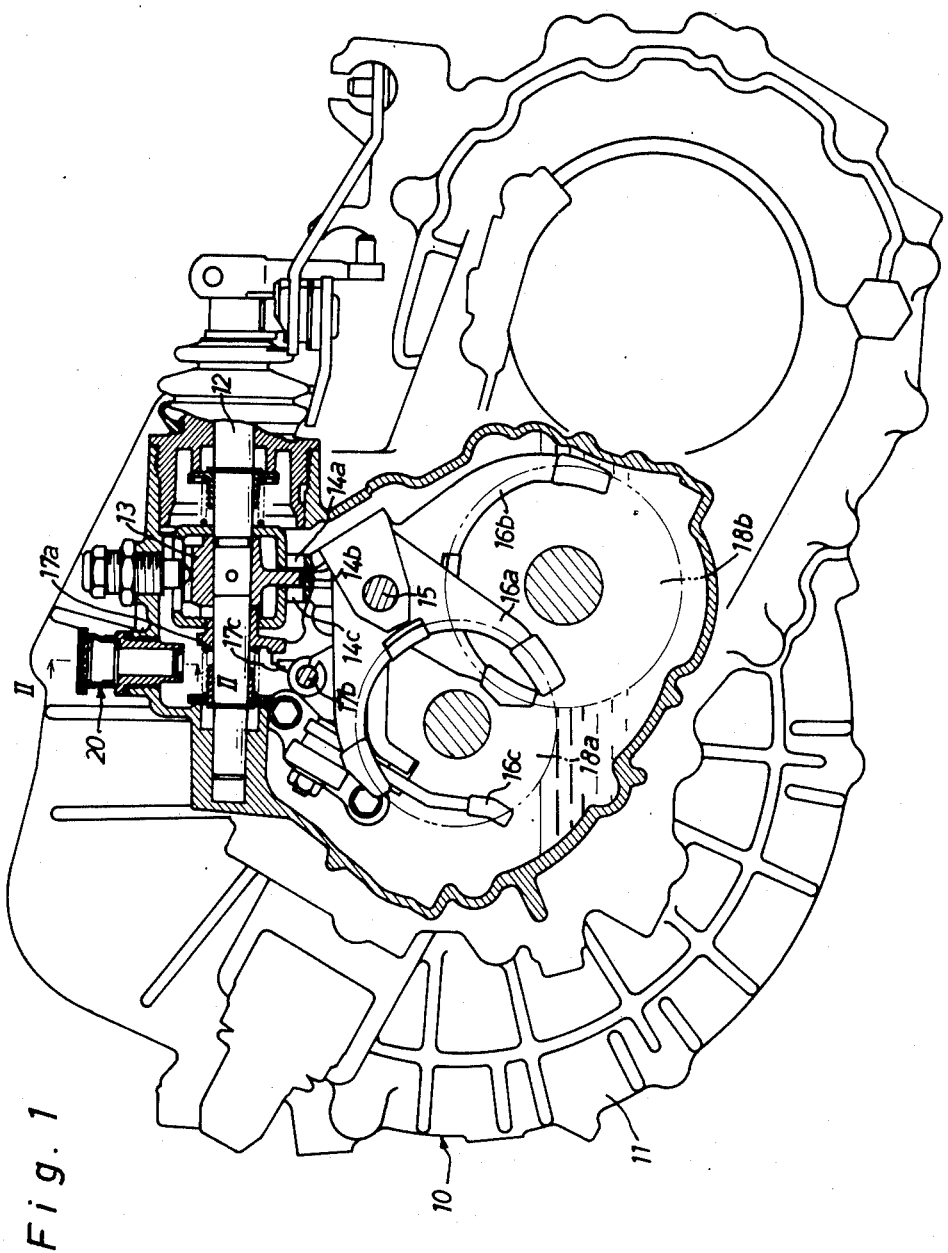
FIG. 1 is a partly broken side view of a power transmission unit showing an air breather plug assembly mounted on a casing of the transmission unit.

In FIG. 1 of the drawings, there is illustrated a power transmission unit 10 for an automotive vehicle of the front-engine front-wheel drive type. A trans-axle casing 11 of the transmission unit 10 is provided therein with a remotely controlled shift mechanism and thereon with an air breather plug assembly 20 which is located above the shift mechanism. The shift mechanism includes a movable shaft 12 assembled within the trans-axle casing 11 for effecting selection of gear ratios between input and output shafts (not shown) of the transmission unit 10. The movable shaft 12 is rotatably and slidably supported from the trans-axle casing 11 and extends outwardly through an oil seal member (not shown) and a dust boot. The outer end of shaft 12 is operatively connected through a shifting linkage (not shown) to a manual shift lever which is arranged within the vehicle compartment to effect axial movement of the shaft 12 in its selecting operation and to effect rotary movement of the shaft 12 in its shifting operation.

The movable shaft 12 is integrally provided at an intermediate portion thereof with a shift-and-select lever 13 which is selectively brought into engagement with shift heads 14a, 14b and 14c in axial movement of the shaft 12. The shift heads 14a, 14b and 14c each are integrally formed with shift forks 16a, 16b and 16c which are slidably mounted on a fork shaft 15. The shift mechanism further includes a reverse restrict lever 17a mounted on the movable shaft 12 for axial movement therewith, a cross-shaft 17b arranged perpendicularly to the shaft 12, and a reverse restrict pin 17c mounted on cross-shaft 17b for engagement with the reverse restict lever 17a. The reverse restrict lever 17a acts as a stopper and is in the form of a component member in a conventional mechanism for preventing an error in shifting operation of the manual shift lever in the reverse direction.

The air breather plug assembly 20 is detachably coupled within a vertical mounting hole or oil filling hole 11a of the trans-axle casing 11 which is located above the movable shaft 12. As shown in FIG. 2, the air breather plug assembly 20 includes a cylindrical plug body 21 threaded into the vertical mounting hole 11a through an annular seal member, a cylindrical member 22 fixedly coupled within an outer end portion of the cylindrical plug body 21, a cup-shaped baffle-plate 23 fixedly coupled within an inner end portion 21b of the plug body 21, a cup-shaped seal member 24 fixedly coupled within an outer end portion of the cylindrical member 22 and spaced from the baffle-plate 23 by a predetermined distance, and a metallic cap 25 fixedly coupled over the outer end of cylindrical member 22 in such a manner as to allow the air flowing from the interior of plug body 21 to the exterior through the seal member 24.

As shown in FIG. 3, the baffle-plate 23 has a head portion 23a formed with a pair of radially spaced semi-circular slots 23b and 23c. The cup-shaped seal member 24 is made of elastic material such as synthetic rubber and has a head portion 24a formed at its outer periphery with an annular lip 24b and at its center with a radial slit 24c, as shown in FIG. 4. The slit 24c is being closed by resiliency of the seal member 24. The metallic cap 25 is formed with a plurality of circumferentially equi-spaced radial projections 25a which are engaged with an outer periphery of cylindrical member 22 to retain the cap 25 in place.

In a condition where the plug body 21 has been threaded into the vertical mounting hole 11a of casing 11 in a liquid-tight manner, the inner end portion 21b of plug body 21 extends into the interior of casing 11 by a predetermined length, and the head portion 25b of cap 25 is maintained in engagement with the annular lip 24b of seal member 24. Assuming that the internal pressure of casing 11 increases due to rise of the ambient temperature, the slit 24c of seal member 24 opens to permit the flow of air out from the interior of casing 11 to the exterior through the plug body 21 and cylindrical member 22.

In operation of the power transmission unit 10, the lubricating oil stored in casing 11 is picked up and scattered by rotation of change-speed gears 18a and 18b. In the upper portion of casing 11 adjacent the plug assembly 20, the scattered lubricating oil flows upwardly in directions as shown by arrows A, B and C in FIG. 2. The flow of lubricating oil shown by arrows A and B is guided by the internal wall of casing 11 and directed to drop along the outer periphery of the inner end portion 21b of plug body 21. This is effective to prevent entry of the lubricating oil into a bore 21a of plug body 21. The flow of lubricating oil shown by arrow C tends to enter into the bore 21a of plug body 21 through the baffle-plate 23. In this instance, the baffle-plate 23 receives a large part of the lubricating oil and permits only a small part of the lubricating oil to flow into the bore 21a of plug body 21 therethrough. The flow of lubricating oil entering into bore 21a is, however, weakened in force in a space between the baffle-plate 23 and seal member 24. Thus, the seal member 24 serves to effectively prevent leakage of the lubricating oil out from the interior of casing 11 to the exterior.

In the case that the mounting hole 11a of casing 11 is in the form of an oil filling hole, the air breather plug assembly 20 may be adapted as an oil filler cap for the power transmission unit.

Although a certain specific embodiment of the present invention has been shown and described, it is obvious that many modifications and variations thereof are possible in light of these teachings. For example, the plug body 21 may be integrally formed with the cylindrical member 22. It is to be understood, therefore, that within the scope of the appended claims, the invention may be practiced otherwise than as specifically described herein.

What is claimed is:

1. An air breather plug assembly adapted for use in a casing of a power transmission unit, comprising:
   a cylindrical plug body detachably threaded into upper portion of said casing and having an inner end portion which extends into an interior of said casing by a predetermined length;
   a cup-shaped baffle-plate fixedly coupled within the inner end portion of said plug body, said baffle-plate having a head portion formed with a slot for permitting the flow of air passing therethrough and being positioned in an interior of said plug body;
   a cup-shaped seal member of elastic material fixedly coupled within an outer end portion of said plug body and having a head portion positioned within the outer end portion of said plug body and being spaced from the head portion of said baffle-plate by a predetermined distance to form a cavity therebetween, the head portion of said seal member being formed with a slit to be opened by an internal pressure applied thereto from the interior of said casing through said baffle-plate; and
   a cap fixedly coupled over the outer end portion of said plug body and being engaged with the head portion of said seal member in such a manner as to allow the air to flow from said cavity to the exterior through the slit of said seal member.

2. An air breather plug assembly as recited in claim 1, wherein the head portion of said seal member is formed at its center with a radial slit and at its outer periphery with an annular lip in engagement with an internal surface of said cap.

3. An air breather plug assembly as recited in claim 1, wherein the head portion of said baffle-plate is formed with a pair of radially spaced semi-circular slots.

4. An air breather plug assembly adapted for use in a casing of power transmission unit, comprising:
   a cylindrical plug body detachably threaded into an upper portion of said casing and having an inner end portion which extends into an interior of said casing by a predetermined length;
   a cylindrical member fixedly coupled within an outer end portion of said plug body;
   a cup-shaped baffle-plate fixedly coupled within the inner end portion of said plug body, said baffle-plate having a head portion formed with a slot for permitting the flow of air passing therethrough and being positioned in an interior of said plug body;
   a cup-shaped seal member of elastic material fixedly coupled within an outer end portion of said cylindrical member and having a head portion positioned within the outer end portion of said cylindrical member and being spaced from the head portion of said baffle-plate by a predetermined distance to form a cavity therebetween, the head portion of said seal member being formed with a slit to be opened by an internal pressure applied thereto from the interior of said casing through said baffle-plate; and
   a cap fixedly coupled over the outer end portion of said cylindrical member and being engaged with the head portion of said seal member in such a manner as to allow the air to flow from said cavity to the exterior through the slit of said seal member.

* * * * *